(12) United States Patent  
Löffelholz et al.

(10) Patent No.: US 7,485,257 B2
(45) Date of Patent: Feb. 3, 2009

(54) VALVE METAL POWDERS

(75) Inventors: Josua Löffelholz, Langelsheim (DE); Hady Seyeda, Vienenburg (DE); Rüdiger Wolf, Goslar (DE); Karlheinz Reichert, Wolfenbüttel (DE); Christoph Schnitter, Holle-Sottrum (DE)

(73) Assignee: H.C. Starck GmbH (DE)

( * ) Notice: Subject to any disclaimer, the term of this patent is extended or adjusted under 35 U.S.C. 154(b) by 365 days.

(21) Appl. No.: 11/237,302

(22) Filed: Sep. 28, 2005

(65) Prior Publication Data

US 2006/0219055 A1 Oct. 5, 2006

Related U.S. Application Data

(62) Division of application No. 10/383,776, filed on Mar. 7, 2003, now Pat. No. 7,066,979.

(30) Foreign Application Priority Data

Mar. 12, 2002 (DE) ................................. 10210876

(51) Int. Cl.
*B22F 3/12* (2006.01)
*C22C 27/02* (2006.01)
(52) U.S. Cl. ............................ 419/23; 75/255; 148/422
(58) Field of Classification Search ............... 75/255; 148/422
See application file for complete search history.

(56) References Cited

U.S. PATENT DOCUMENTS 3,849,124 A * 11/1974 Villani ........................ 420/422
5,098,469 A * 3/1992 Rezhets ...................... 75/249
5,741,376 A * 4/1998 Subramanian et al. ...... 148/422
5,986,877 A 11/1999 Pathare et al. ............... 361/508
6,024,914 A 2/2000 Yoshida ...................... 419/23
6,136,062 A 10/2000 Loffelholz et al. ............ 75/369
6,193,779 B1 2/2001 Reichert et al. .............. 75/343
6,218,025 B1 * 4/2001 Fromm et al. ............... 428/544
6,238,456 B1 5/2001 Wolf et al. .................... 75/245

FOREIGN PATENT DOCUMENTS

| CA | 2018346 | 12/1990 |
| GB | 2201427 A | 9/1988 |
| GB | 2236329 A | 4/1991 |
| WO | 00/15555 | 3/2000 |

(Continued)

OTHER PUBLICATIONS

J. Mater. Chem., 8(6), (month unavailable) 1998, pp. 1447-1451, Heiko Thoms et al, "Metal diolates: useful precursors for tailor-made oxides prepared at low temperatures".

(Continued)

*Primary Examiner*—George Wyszomierski
(74) *Attorney, Agent, or Firm*—Connolly Bove Lodge & Hutz LLP

(57) ABSTRACT

A valve metal powder by is prepared by a particular set of sequential steps that involves the use of precursor having preformed morphology. The method by which the valve metal is prepared includes a stabilization step that results in the valve metal powder having secondary and tertiary structures that each corresponds to the secondary and tertiary structures of the precursor. Also described is a method of producing solid electrolyte capacitors that include the valve metal powder of the present invention.

14 Claims, 6 Drawing Sheets

FOREIGN PATENT DOCUMENTS

| WO | 00/15555 | A1 | 3/2000 |
| WO | 00/15556 | A1 | 3/2000 |
| WO | 00/67936 | | 11/2000 |
| WO | 00/67936 | A1 | 11/2000 |
| WO | 01/71738 | A2 | 9/2001 |
| WO | 02/090024 | A1 | 9/2001 |
| WO | 01/82318 | | 11/2001 |

OTHER PUBLICATIONS

J. Mater. Chem., 9, (month unavailable) 1999, pp. 2953-2957, Debojit Chakrabarty et al, "Aragonite crystals with unconventional morphologies".

J. Mater. Chem., 9, (month unavailable) 1999, pp. 2871-2878, Lingna Wang et al, "Synthesis of zinc oxide nanoparticles with controlled morphology".

J. Mater. Chem., 8(3), (month unavailable) 1998, pp. 743-750, Hong Kong et al, "Synthesis of mesoporous silica spheres under quiescent aqueous acidic conditions".

Third Euro-Ceramics V.1, (month unavailable) 1993, pp. 573-578, A.D.S. Costa et al, "Processing of Porous Ceramic Substrates".

Third Euro-Ceramics V.1, (month unavailable) 1993, pp. 633-638, T. Moritz et al, "Granulated by Spray-Freeze Drying".

* cited by examiner

VALVE METAL POWDERS

CROSS REFERENCE TO RELATED PATENT APPLICATION

The present divisional patent application claims priority under 35 U.S.C. §121 to U.S. patent application Ser. No. 10/383,776 filed Mar. 7, 2003, now U.S. Pat. No. 7,066,979.

FIELD OF THE INVENTION

The invention relates to a process for producing a valve metal powder by reducing a valve metal oxide, to valve metal powders obtainable in this way and to their use for producing solid electrolyte capacitors.

BACKGROUND OF THE INVENTION

Valve metals, especially those from transition groups 4-6 of the periodic system, and in particular tantalum and niobium, and alloys thereof, have numerous applications. One of the most important current applications for the above mentioned metal powders are solid electrolyte capacitors. Ta metal powders for this application are generally produced by Na reduction of potassium tantalum fluoride $K_2TaF_7$. Recently, reduction of the oxide has also been used to an increasing extent. In this context, reduction by means of gaseous reducing agents, to $H_2$, alkali metal or alkaline earth metal, is preferred. In particular, magnesium vapor has proven to be a suitable reducing agent (WO 00/67936 A1, WO 00/15555 A1). These processes make it possible to produce high-quality valve metal powders, in particular tantalum and niobium powders, their alloys and their suboxides. All the processes described above prefer to use oxides in powder form, although other starting morphologies of the valve metal oxides or mixtures thereof which are to be reduced are also described. The desired physical properties and morphologies of the valve metal powders obtained by the reduction are adjusted by varying the reduction conditions or preferably by further treatment of the primary powders which originate from the reduction (e.g. WO 00/67936 A1, p. 9, lines 9 to 11).

WO 00/67936 A1 also describes a two-stage process for the reduction of niobium and tantalum pentoxide. In the first stage, the pentoxide is reduced using hydrogen, and in this way a corresponding suboxide is produced. The suboxide is then preferably sintered for 60 to 360 minutes at a temperature of greater than 1000° C., leading to stabilization of the crystal structure, i.e. of the primary structure of the suboxide. In the second stage, the suboxide is reduced to the metal using magnesium vapor. The morphology of the oxide, i.e. including of the secondary and tertiary structure, is not stabilized. This can be seen, for example, from Example 11, in which niobium pentoxide with a mean grain size of 1.7 µm is subjected to the two-stage reduction process described. The metal powder produced has a $D_{50}$ value, determined using MasterSizer, of 160.9 µm, i.e. the mean grain size and therefore also the morphology have drastically changed.

The targeted adjustment of oxide morphologies is sufficiently well known (Heiko Thomas, Matthias Epple, Michael Fröba, Joe Wong, Armin Reller, *J. Mater. Chem.*, 1988, 8(6), pp. 1447-1451 and Lingna Wang, Mamoun Muhammed, *J. Mater. Chem.*, 1999, 9, pp. 2871-2878). For example, DE 3918691 A1 has already described methods for setting defined primary grain sizes for oxides of niobium. It is also known to set defined agglomerate shapes and sizes. For example, processes for producing oxidic fibers and fabric produced therefrom, the production of defined agglomerates with particular properties, such as pore distribution (A. D. S. Costa, L. S. M. Traqueia, J. A. Labrincha, J. R. Frade, F. M. B. Marques, Third EURO-CERAMICS V. 1, 1993, pp. 573-578), flow properties or pressure properties (T. Moritz, T. Reetz, Third EURO-CERAMICS V. 1, 1993, pp. 633-638), as well as the production of platelets (Debojit Chakrabarty, Samiran Mahapatra, *J. Mater. Chem.* 1999, 9, pp. 2953-2957) or spherical particles (Hong Yang, Gregory Vovk, Neil Coombs, Igor Sokolov, Geoffrey A. Ozin, *J. Mater. Chem.*, 1998, 8(3), pp. 743-750) have been described. Many metal oxide powders with corresponding oxide morphologies are even commercially available. The applications of metal oxides having defined oxide morphologies of this type are numerous, extending from spray powders for coating through pastes to applications in nanotechnology. There are also numerous processes used to produce such defined oxide morphologies. By way of example, mention may be made in the present context of the production of oxidic fibers via sol-gel chemistry and subsequent spinning of the gel.

A direct relationship between the morphology of the oxide used and a valve metal powder or its alloys or suboxides resulting from the reduction has not hitherto been described.

SUMMARY OF INVENTION

It is an object of the invention to provide a process for producing valve metal powders having a specially tailored morphology by reduction of corresponding oxides, it being possible to retain the desired morphology without the need for an expensive further treatment step.

The object is achieved by a process in which the desired morphology is preformed in a targeted fashion in a precursor. This precursor is converted into a structure-stabilized oxide and is then converted into the metal by a reduction process while retaining the morphology.

Therefore, the subject matter of the invention is a process for producing a valve metal powder, comprising the steps of:

a) roducing a precursor of preformed morphology, b) onverting the precursor into an oxide of the valve metal, c) stabilizing the structure of the oxide by heat treatment, and d) reducing the stabilized oxide while retaining the morphology.

If appropriate, the stabilization of the morphology of the oxide may take place as early as during the conversion of the precursor into the oxide. This can be achieved by means of targeted temperature control during the conversion.

Furthermore, it is possible for the precursor already to be an oxide. In this case, step b) is dispensed with.

The morphology of the valve metal powders obtainable in this way is distinguished by a multiply stepped, tailored structure having a primary, secondary and tertiary structure. The primary structure is determined by the size of the primary grains which are formed during the reduction and corresponding further treatment steps. The secondary structure and the tertiary structure are determined by the morphology of the precursor. In a special case, it is even possible, as a result of the primary structure of the valve metal powder subsequently being sintered, to obtain valve metal powders whose morphology corresponds to the primary and secondary structure of the precursor.

DETAILED DESCRIPTION OF THE INVENTION

Figure 1:
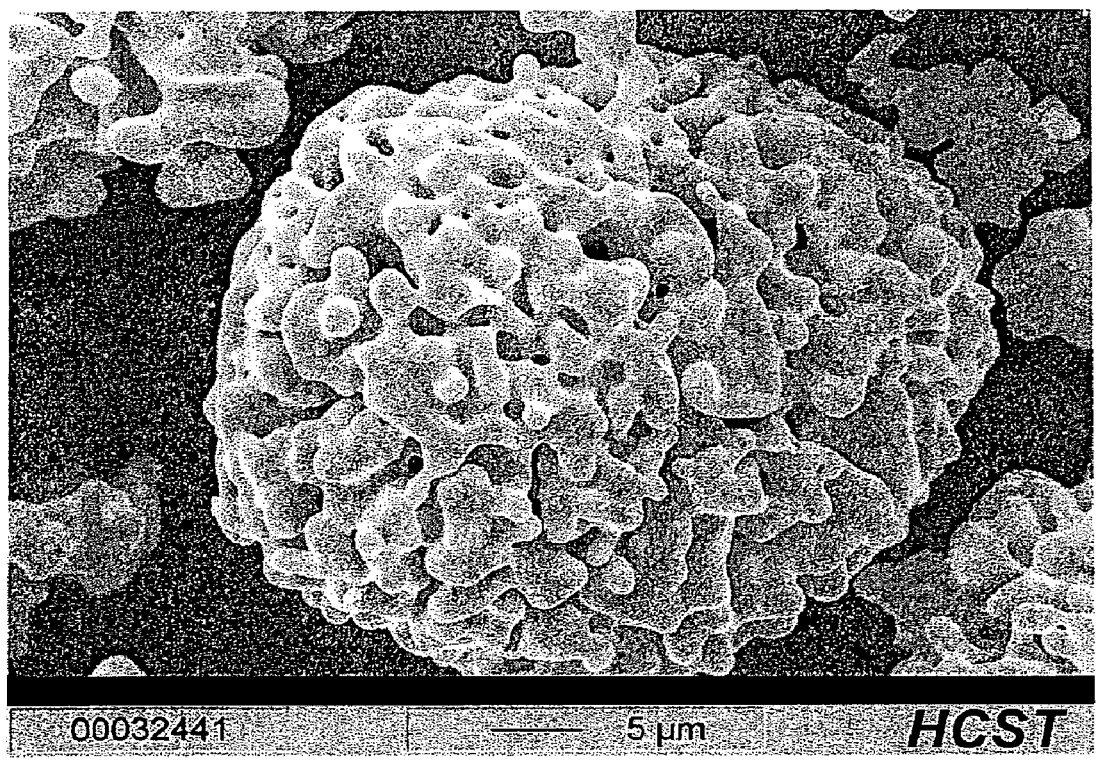
FIG. 1 shows an image of the oxide produced by means of scanning electron microscope (SEM image).

According to the invention, the desired morphology is established by the fact that it is initially preformed in a precursor, and the latter is then converted into the oxide, for example by calcining. The conversion into the oxide may already be carried out in such a way that the morphology of the oxide is stabilized. Preferably, however, the structure of the oxide is stabilized by a subsequent heat treatment. This oxide which has been stabilized in this way is converted into the metal by reduction while retaining the morphology.

The heat treatment for stabilizing the oxide, if a tantalum oxide is used, is preferably carried out at a temperature of from 1000 to 1800° C., particularly preferably from 1500 to 1800° C., especially preferably from 1600 to 1750° C. If a niobium oxide is used, the heat treatment for stabilizing the oxide is preferably carried out at a temperature of from 1000 to 1600° C., particularly preferably from 1350 to 1550° C., especially preferably from 1400 to 1500° C.

The heat treatment for stabilization is preferably carried out in the presence of air or under inert gas, for example under nitrogen or argon. In the case of the stabilization of niobium oxide, it is also possible to work in the presence of hydrogen. If the niobium oxide is $Nb_2O_5$, this leads to a reduction to form $NbO_2$, so that in this case stabilization and reduction are coupled with one another.

Suitable precursors are compounds which can be converted into the oxide or even the oxide itself. An oxide precursor is converted into the desired morphology by techniques such as milling, granulation, coagglomeration or agglomeration techniques. Suitable precursors are also valve metal compounds, hydroxides, organometallic compounds and nitrates being particularly suitable. These can be produced using precipitation and crystallization processes or using targeted shaping processes such as spinning, sol-gel techniques, weaving, spraying, deposition techniques on surfaces with a desired morphology. This precursor is converted into the desired oxide, for example by calcining, while retaining the morphology. According to the invention, to retain the morphology in the metal, the oxide is either stabilized in targeted fashion during its production or preferably by means of a further heat treatment. After the oxide with a stabilized structure has been produced, it is reduced to form the metal. The reduction method used in this context is preferably magnesium vapor reduction.

The invention makes it possible to set the properties required in the valve metal powders, via a precursor, directly in the oxide, and in this way makes it possible to produce valve metal powders for various applications, such as, for example, spray powders, sintering powders or preferably powders for the production of solid electrolyte capacitors.

There are a wide range of demands for the valve metal powders required for production of solid electrolyte capacitors, in particular tantalum and niobium powders and their alloys or suboxides. For example, such powders have to have surface areas of 0.4 $m^2$/g up to 10 $m^2$/g in order to achieve the required capacitances. Furthermore, a good forming and impregnation behavior is required, which presupposes a defined particle and pore size distribution. Moreover, losses (residual currents) in the solid electrolyte capacitor are to be minimized, which requires a high purity and accurate control of impurities and dopants. In addition, automated processing has to be possible. This requires the powders to have good flow and pressing properties.

In the course of the ongoing miniaturization of electronic components, the passive components required for this purpose are also becoming ever smaller. However, their performance needs to be retained or even increased. In the case of solid electrolyte capacitors made from valve metal powders or suboxides thereof, this is achieved by reducing the size of the primary structure and therefore, as a corollary effect, by increasing the surface area of the powder in order to achieve the required capacitances. The latter property generally causes a significant deterioration to the flow properties and the homogeneity in the pressed anode. Complex further treatment endeavors to modify the secondary structure and tertiary structure in such a way that the flow properties are improved. As a result, agglomerates of the order of magnitude of 100 μm, the mean size of which fluctuates considerably, are formed. The drawback of such powders is that non-uniform packing densities are obtained during the pressing of anode bodies.

The process according to the invention makes it possible, for example, to preform significantly smaller, spherical agglomerates with a very narrow grain size distribution (determined by means of MasterSizer, ASTM B 822), i.e. with a very homogeneous tertiary structure, in the oxide and to convert them into the metal while retaining the morphology. This represents significant progress over the prior art. For example, it is possible to obtain very narrow distributions of spherical agglomerates with a $D_{50}$ value, determined by means of MasterSizer, ASTM B 822, in the range between 10 and 80 μm, preferably between 20 and 40 μm. Valve metal powders or valve metal suboxides of this type have similar surface areas and capacitances to the high-capacitance powders which have been disclosed hitherto. Unlike the latter, the flow properties are retained. The homogeneous grain size distribution and relatively small agglomerate size results in a uniform packing density in the anode and therefore in an improvement in the quality and the yield for the user. Furthermore, it is also possible to set the secondary structure in such a way that good impregnability of the agglomerate is retained even with a very fine primary structure. The pore structure required for this purpose has a bimodal distribution, with the finer distribution corresponding to the primary structure, and the maximum in the coarser range corresponds to the secondary structure, ensuring good impregnability of the anode body with the counterelectrode, for example manganese dioxide or a conductive polymer. The maximum of the pores of the secondary structure is, for example, between 0.5-5 μm, preferably between 0.7-2 μm.

The above-described, multifarious requirements cannot be satisfied with a single powder, but rather require a range of powder morphologies. Performing the required morphologies as early as in the oxide, prior to the reduction, and stabilizing these morphologies represents a simplification compared to the known processes and offers significant benefits. For example, fibers comprising oxides of the valve metals can be produced that very greatly reduce expense compared to the corresponding metal fibers, and can even be bought in for many oxides or mixtures thereof. Also, the production of fabrics from oxide is easier than the production of metal fabrics. Mixtures of the oxides are particularly simple to produce. These can be obtained at atomic level by co-precipitation or sol-gel processes, or macroscopically by simply milling and mixing the oxides, which are less ductile than the associated metals. The purities of the oxides produced by wet-chemical processes, as well as targeted doping at atomic level, are also easier to control in the oxide than in the metal.

According to the inventive process, a valve metal powder, in particular one from transition group 4-6 of the periodic system, in particular tantalum niobium and alloys or suboxides thereof is obtained, with the desired morphology being preformed as early as in the oxide, and the oxide being converted into the metal by reduction, preferably by reduction using gaseous reducing agents, and particularly preferably by magnesium vapor reduction. This takes place while retaining the morphology which has been preformed in the oxide.

Oxides of various valve metals or mixtures of two or more oxides in any desired ratio with or without dopants can be used to produce the desired oxide morphologies. $Nb_2O_5$ or $Ta_2O_5$ or mixtures thereof with one another or with other valve metals is preferably used. The oxides are produced using known processes. For example, tantalum and niobium pentoxide ($Ta_2O_5$ and $Nb_2O_5$) or mixtures thereof are produced by hydrolysis or combustion of tantalum compounds or niobium compounds or mixtures thereof. Preferably they are produced by precipitation of heptafluorotantalic acid ($H_2TaF_7$) and heptafluoroniobic acid ($H_2NbF_7$) or mixtures thereof from hydrofluoric acid solution by means of bases, in particular ammonia ($NH_3$), as tantalic acid $Ta(OH)_5$ or niobic acid $Nb(OH)_5$ or mixtures thereof and subsequent heat treatment. The desired morphology can be set both by targeted selection of precipitation conditions and during a later part of the process in the hydroxide or in the oxide. With simultaneous metering of the heptafluoro acid and ammonia, it is in this way possible, for example in a continuous process, to obtain spherical agglomerates with a uniform particle size distribution in the range from 10-80 μm and a defined pore size distribution. The agglomerate properties are in this case dependent on the concentrations of the starting solutions, the residence time in the reaction vessel and the pH. For example, to continuously produce spherical agglomerates, the precipitation process is carried out with concentrations of the heptafluoro acids of tantalum or niobium or mixtures thereof of between 10 and 300 g/l, but preferably 50-200 g/l, with $NH_3$-concentrations of 1-20% by weight, but preferably with 3-9%, by weight, a mean residence time of the precipitated agglomerates of between 0.25 and 24 h, but preferably between 30 min and 3 h, and a pH at the precipitation process temperature of between 7 and 12, but preferably between 7.3-8.3. Even when different precipitation conditions are selected, it is possible to obtain a targeted spherical morphology, for example by spray drying.

The desired purity is achieved by purification, if necessary repeated purification, of the heptafluoro acids of tantalum and niobium or mixtures thereof. If necessary, impurities can be reduced down to the ppb range.

The hydroxides obtained in this way are dried and calcined. If necessary, this is followed by a mechanical treatment, such as sieving, crushing, milling or agglomeration. The agglomerate structure is stabilized by a high-temperature treatment, preferably in the temperature range >1000° C. particularly preferably close to the melting point of the oxides. In this way, it is possible to strengthen sintered bridges between the primary grains and to deliberately vary the pore structure. In this context, the set crystallite size of the oxide determines the secondary structure of the valve metal powder produced, and the external shape of the oxide particle/agglomerate determines the tertiary structure.

The high-temperature treatment may in turn be followed by a mechanical treatment, such as sieving, crushing or milling. Any impurities which are introduced, such as carbon, can be removed via a post-anneal in air, preferably at temperatures between 800-1200° C.

The oxides produced in this way, with a defined morphology, are then converted into the metal by reduction.

The reduction is preferably carried out as described in WO 00/67936 A1 or EP 997 542 A1. For this purpose, the oxide is reacted either in a two-stage reduction with liquid magnesium and gaseous magnesium or in a one-stage reduction with gaseous magnesium. The primary structure of the metal powder can be set by means of the reduction conditions as well as downstream steps which are known to the person skilled in the art, such as vacuum high-temperature agglomeration or deoxidation.

The valve metal powder produced using the process according to the invention can be treated further in a known way following production. If the valve metal powder is to be used, for example, to produce capacitors, it may be advantageous for the valve metal powder to be subjected to an agglomeration under high vacuum, for example at a temperature of 1350° C. This is preferably followed by doping with phosphorus by treatment with $H_3PO_4$, deoxidation with magnesium, in which preferably 1.5 times the stoichiometric quantity of magnesium, based on the oxygen content in the agglomerated primary powder is used, washing with a mineral acid, for example, dilute $H_2SO_4$ and finally drying and sieving to <300 μm.

The subject matter of the invention is also valve metal powders obtainable using the process according to the invention, the secondary structure and tertiary structure of which is determined by the morphology of the precursor.

The subject matter of the invention is also valve metal powders comprising spherical agglomerates, having a $D_{50}$ value, determined by means of MasterSizer in accordance with ASTM B 822, of 10-80 μm, preferably of 20-40 μm, with the valve metal powder flowing freely through a Hall-Flow funnel (ASTM B 212 or B 417) with a funnel opening diameter of 2/10 inch, preferably 1/10 inch.

The valve metal powders according to the invention preferably have a narrow grain size distribution. The $D_{90}$ value, determined by means of MasterSizer in accordance with ASTM B 822, preferably corresponds to at most 1.5 times the $D_{50}$ value, determined by means of MasterSizer in accordance with ASTM B 822, particularly preferably at most 1.3 times the $D_{50}$ value. The $D_{10}$ value, determined by means of MasterSizer in accordance with ASTM B 822, is preferably greater than 5 μm, particularly preferably greater than 10 μm.

The valve metal is preferably tantalum, niobium or alloys thereof.

The valve metal powders according to the invention are distinguished in particular by the fact that anode bodies produced therefrom have a bimodal pore distribution, the smaller maximum of the pore distribution corresponding to the primary structure of the valve metal powder, and the larger maximum of the pore distribution corresponding to the secondary structure. This allows good impregnability of the anode body with the counterelectrode.

Valve metal powders which allow the production of anode bodies with a bimodal pore distribution, in which the larger maximum of the pore distribution, determined by means of mercury porosimetry, is between 0.5-5 μm, preferably between 0.7-2 μm, are preferred.

The valve metal powders according to the invention are versatile in use. They are preferably used to produce solid electrolyte capacitors, particularly preferably to produce solid electrolyte capacitors which have capacitances of >50000 CV/g. For this purpose, the valve metal powders are pressed to form anode bodies which are distinguished by a particular homogeneity, i.e. a uniform pressed density distribution.

The invention is explained in more detail below with reference to examples, the examples being intended to facilitate comprehension of the principle according to the invention without being understood as any restriction thereto.

EXAMPLES

The metal oxide powders or metal powders produced in the following examples were analyzed with regard to various chemical and physical properties as indicated in the Examples. Unless stated otherwise, the procedure was as follows:

The chemical composition was determined by means of conventional automated analysis units.

The loss on ignition was determined gravimetrically by differential weighing. The temperature at which the loss on ignition was determined is given for the individual examples. The tap densities given were determined in accordance with ASTM B 527; the grain size distribution ($D_{10}$, $D_{50}$ and $D_{90}$ values) was determined by means of laser defraction using a MasterSizer Sμ produced by MALVERN (ASTM B 822); the sieve analysis was determined in accordance with ASTM B 214, and the specific surface area was determined using the known Brunauer, Emmett and Teller method (BET method). The bulk density was determined on a Scott-Volumeter (ASTM B 329), the mean grain diameter was determined by means of Fisher Sub Sieve Sizer (FSSS, ASTM B 330) and the flow property was determined by means of Hall Flow measurements using a 1/10" funnel (ASTM B 213). The press strength was determined on a pressed powder compact (length 5.1 mm, diameter 5.1 mm, pressed density 5.0 g/cm$^3$) with a Chatillon force-measuring device. Unless stated otherwise, the percentages are percentages by weight.

Example 1

Reduction of Spheroidal $Ta_2O_5$ in High-Purity Quality (LT-Quality) to Form Spheroidal Ta Powder of Analogous Morphology a) Production of the Spherical Hydroxide Precursor With 300 l of deionized $H_2O$ being included in the initial charge, 6360 l of $H_2TaF_7$ solution with a Ta concentration, calculated as $Ta_2O_5$ of 80-120 g/l (metallic impurities <5 mg/l per element) were continuously precipitated with 5655 l of an ultrapure aqueous $NH_3$ solution (6% strength) in such a way that the pH was 7.6±0.4. The temperature was 35-40° C. The suspension obtained in this way was forced through a pressure filter and washed firstly with an aqueous $NH_3$ solution (3% strength) and then with deionized water. Then, the moist hydroxide was dried for 24 h at 100° C. in a drying cabinet.

Analysis: F$^-$=0.22%.

b) Production of the Oxide

The spherical tantalum hydroxide produced under a) was introduced into dishes and annealed in air for approx. 6 h at 1270° C. The product was then sieved at <600 μm.

Yield: 460 kg $Ta_2O_5$<600 μm and 42 kg $Ta_2O_5$>600 μm

| Chemical analysis: | |
|---|---|
| Al | <0.2 ppm |
| As | <0.2 ppm |
| Ca | <0.5 ppm |
| Co | <0.05 ppm |
| Cr | <0.05 ppm |
| Cu | <0.1 ppm |
| F | <2 ppm |
| Fe | 1 ppm |
| K | <0.2 ppm |
| Mo | <0.1 ppm |
| Na | <0.5 ppm |
| Nb | 3 ppm |
| Ni | <0.1 ppm |
| Si | 2 ppm |
| Ti | <0.1 ppm |
| V | <0.05 ppm |
| Zr | <0.05 ppm |
| Physical analysis: | |
| Loss on ignition (1200° C./2 h): | <0.05% |
| Tap density: | 2.8 g/cm$^3$ |
| Grain size distribution: | $D_{10}$ 5.51 μm |
| | $D_{50}$ 23.94 μm |
| | $D_{90}$ 40.00 μm |
| Sieve analysis: | 97.1% <45 μm |
| Specific surface area: | 0.41 cm$^2$/g | c) Stabilization of the Oxide 10 kg of the oxide were annealed at 1700° C. under argon for 4 h. The white oxide was comminuted and sieved to less than 1000 μm.

d) Reduction of the Spherical, Stabilized Oxide to Form Ta Powder 1000 g of the stabilized tantalum oxide produced under 1c) were placed onto a fabric sieve located in a Ta dish. 300 g of magnesium chips were placed below. The dish was closed and reduction was carried out in a retort for 6 h at 950° C. under argon. After cooling, air was slowly introduced into the retort, in order to allow the metal surfaces to be passivated. The material was forced through a 1000 μm sieve in order to be comminuted.

The reaction material obtained in this way was leached in 12% strength sulfuric acid and washed neutral using deionized water. The moist powder was then dried for 24 h at 50° C. 750 g of Ta powder were obtained.

Properties of the primary powder obtained in this way:

| | |
|---|---|
| Specific surface area: | 2.4 m$^2$/g |
| Bulk density: | 24.0 g/inch$^3$ |
| Oxygen: | 7680 ppm | e) Finishing to Form the Capacitor Powder

The crude powder obtained in this way was finished in a known way corresponding to a conventional capacitor powder:

Agglomeration at 1350° C. under a high vacuum

P-Doping with 100 ppm of P by means of $H_3PO_4$

Deoxidation at 920° C. using 1.5 times the stoichiometric quantity of magnesium, based on the oxygen content in the agglomerated primary powder Washing with dilute $H_2SO_4$ Drying and sieving <300 μm The Ta capacitor powder obtained in this way had the following properties:

| Physical analysis: | | |
|---|---|---|
| Bulk density: | 26.9 g/inch$^3$ | |
| Mean grain diameter (FSSS): | 2.26 μm | |
| Press strength: | 8 kg | |
| Specific surface area: | 1.2 m$^2$/g | |
| Flow property: | 26 s/25 g | |
| Grain size distribution: | $D_{10}$ | 13 μm |
| | $D_{50}$ | 32 μm |
| | $D_{90}$ | 210 μm |
| Sieve analysis: | >300 μm | 0% |
| | >212 μm | 2.8% |
| | >150 μm | 3.3% |
| | >106 μm | 2% |
| | >63 μm | 1.9% |
| | >38 μm | 7.8% |
| | <38 μm | 82.6% |

| Chemical analysis: | |
|---|---|
| C | 24 ppm |
| H | 99 ppm |
| Mg | 15 ppm |
| N | 625 ppm |
| O | 3183 ppm |
| P | 94 ppm |
| Na | <0.5 ppm |
| K | <0.5 ppm |
| Fe | 9 ppm |
| Cr | <2 ppm |
| Ni | <3 ppm |

Electrical Test:

The powder was pressed to a pressed density of 5.75 g/cm$^3$ and sintered under high vacuum at 1400° C. The pellet obtained in this way was anodically oxidized (formed) in $H_3PO_4$ with a conductivity of 4300 μS at 30 V. The residual current of the anode was measured in the same electrolyte, and the capacitance in 18% strength $H_2SO_4$.

| | |
|---|---|
| Sintered density | 6.3 g/cm$^3$ |
| Specific capacitance: | 44828 μFV/g |
| Residual current: | 0.32 nA/μFV |

Example 2

Reduction of Spheroidal $Ta_2O_5$ in Pure Quality (HPO-Quality) to Form Spheroidal Ta Powder of Analogous Morphology a) Production of the Spherical Hydroxide Precursor With 10 l of deionized $H_2O$ being included in the initial charge, 90 l of $H_2TaF_7$ solution with a tantalum concentration of approx. 170 g/l, calculated as $Ta_2O_5$ (approx. 20 mg/l of Sb and 2 mg/l of Nb) were precipitated continuously with 70 l of ultrapure aqueous $NH_3$ solution (6% strength), in such a way that the pH was 7.6±0.4. The temperature was 35-40° C. The suspension obtained in this way was forced through a pressure filter and washed firstly with 330 l of aqueous $NH_3$ solution (3% strength) and then with deionized water. The moist hydroxide was then dried for 24 h at 100° C. in a drying cabinet.

b) Production of the Oxide

The spherical tantalum hydroxide produced under a) was placed in dishes and annealed for approx. 2 h in air at 1270° C. The product was then sieved to <600 μm.

Yield: 1.5 kg of $Ta_2O_5$ <600 μm

| Chemical Analysis: | |
|---|---|
| Al | <0.2 ppm |
| As | 3 ppm |
| Ca | 0.8 ppm |
| Co | <0.05 ppm |
| Cr | 0.4 ppm |
| Cu | 0.2 ppm |
| F | <2 ppm |
| Fe | 4 ppm |
| K | 0.4 ppm |
| Mo | <0.1 ppm |
| Na | 0.5 ppm |
| Nb | 14 ppm |
| Ni | <0.1 ppm |
| Sb | 110 ppm |
| Si | 6 ppm |
| Ti | 0.2 ppm |
| V | <0.05 ppm |
| Zr | <0.05 ppm |

| Physical analysis: | | |
|---|---|---|
| Loss on ignition (1200° C./2 h): | 0.09% | |
| Tap density: | 2.6 g/cm$^3$ | |
| Grain size distribution: | $D_{10}$ | 2.50 μm |
| | $D_{50}$ | 38.09 μm |
| | $D_{90}$ | 68.50 μm |
| Sieve analysis: | 55.5% | <45 μm |
| | 38.7% | <90 μm |
| Specific surface area: | 0.58 g/cm$^2$ | | c) Stabilization of the Oxide 2 kg of the oxide were annealed at 1600° C. under air for 10 h. The white oxide obtained was comminuted and sieved to less than 1000 μm.

FIG. 1 shows an image of the oxide produced by means of scanning electron microscope (SEM image).

d) Reduction of the Spherical, Stabilized Oxide to Form Ta Powder 400 g of the stabilized tantalum oxide produced under 2c) were placed onto a fabric sieve positioned in a Ta dish. 120 g of magnesium chips were placed beneath it. The dish was closed and reduction was carried out in a retort for 6 h at 920° C. under argon. After cooling, air was slowly introduced into the retort in order to allow passivation of the metal surfaces. The material was forced through a 1000 μm sieve in order to be comminuted.

The reaction material obtained in this way was leached in 12% strength sulfuric acid and washed neutral using deionized water. The moist powder was then dried for 24 h at 50° C. 290 g of Ta powder were obtained.

Properties of the primary powder obtained in this way:

| | |
|---|---|
| Specific surface area: | 2.8 m$^2$/g |
| Bulk density: | 23.5 g/inch$^3$ |
| Oxygen: | 8960 ppm |

Figure 2:
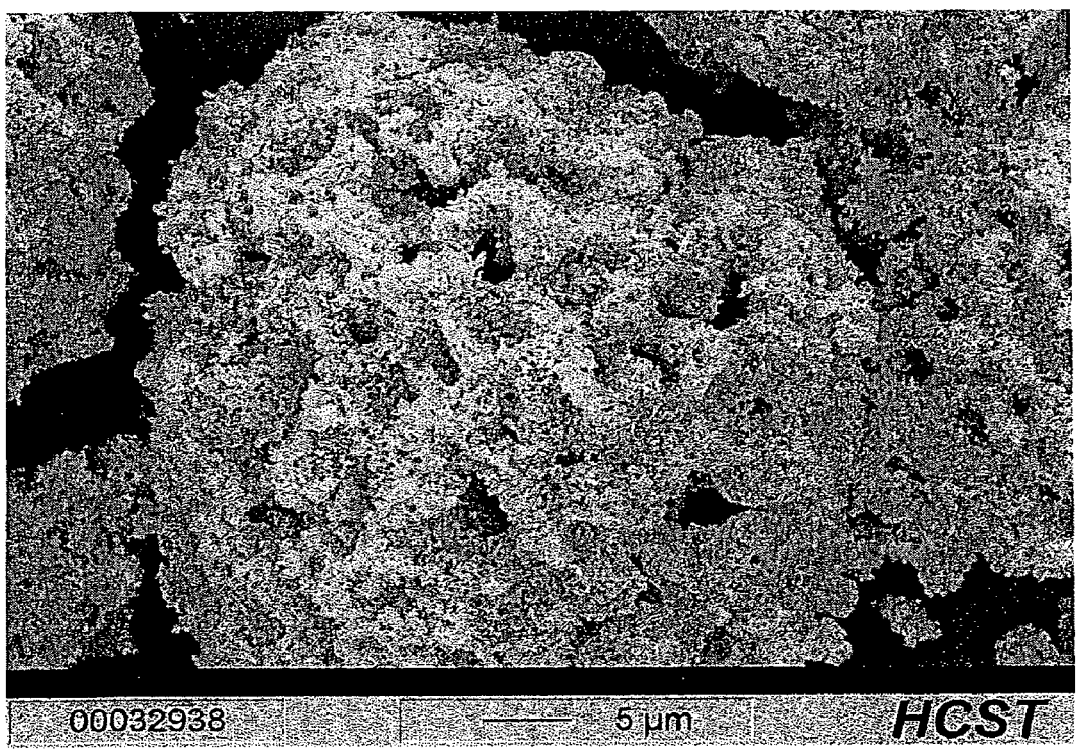
FIG. 2 shows an SEM image of the tantalum powder.

FIG. 2 shows an SEM image of the tantalum powder. A comparison with FIG. 1 shows that the morphology is retained during the reduction of the stabilized oxide.

e) Finishing to Form the Capacitor Powder

The untreated powder obtained in this way was finished in the same way as a conventional capacitor powder:

Agglomeration at 1120° C. under a high vacuum
P-Doping with 150 ppm of P by means of $H_3PO_4$
Deoxidation at 850° C. using 1.5 times the stoichiometric quantity of magnesium, based on the oxygen content of the agglomerated primary powder
Washing with dilute $H_2SO_4$
Drying and sieving <300 µm The Ta capacitor powder obtained in this way had the following properties:

| Physical analysis: | | |
|---|---|---|
| Bulk density: | 25 g/inch$^3$ | |
| Mean grain diameter (FSSS): | 1.76 µm | |
| Press strength: | 4.4 kg | |
| Specific surface area: | 2.0 m$^2$ | |
| Flow property: | 32 s/25 g | |
| Grain size distribution: | $D_{10}$ | 12 µm |
| | $D_{50}$ | 31 µm |
| | $D_{90}$ | 175 µm |
| Sieve analysis: | >300 µm | 0.4% |
| | >212 µm | 1.4% |
| | >150 µm | 2.2% |
| | >106 µm | 1.4% |
| | >63 µm | 2.4% |
| | >38 µm | 2% |
| | <38 µm | 90.2% |

| Chemical analysis: | |
|---|---|
| C | 18 ppm |
| H | 156 ppm |
| Mg | 15 ppm |
| N | 1244 ppm |
| O | 5392 ppm |
| P | 130 ppm |
| Na | <0.5 ppm |
| K | <0.5 ppm |
| Fe | 26 ppm |
| Cr | 3 ppm |
| Ni | <3 ppm |

Electrical Test:

The powder was pressed with a press density of 5.0 g/cm$^3$ and sintered under a high vacuum at 1260° C. The pellet obtained in this way was anodically oxidized (formed) in $H_3PO_4$ with a conductivity of 4300 µS at 30 V. The residual current of the anode was measured in the same electrolyte, and the capacitance was measured in 18% strength $H_2SO_4$.

| | |
|---|---|
| Sintered density: | 4.5 g/cm$^3$ |
| Specific capacitance: | 94570 µFV/g |
| Residual current: | 0.72 nA/µFV |

Example 3

Reduction of Spheroidal $Nb_2O_5$ to Form Spheroidal Nb Powder of Analogous Morphology a) Production of the Spherical Hydroxide Precursor 4000 l of $H_2NbF_7$ solution with a Nb concentration of approx. 125 g/l, calculated as $Nb_2O_5$, were continuously precipitated with 10980 l of ultrapure aqueous $NH_3$ solution (6% strength) in such a way that the pH was 7.6±0.4. The temperature was 35–40° C. The suspension obtained in this way was pressed through a pressure filter and washed firstly with 4400 l of aqueous $NH_3$ solution (3% strength) and then with deionized water. The moist hydroxide was then dried for 24 h at 100° C. in a drying cabinet.

Analysis: F$^-$<0.1%.

b) Production of the Oxide

The spherical niobium hydroxide produced under a) was placed into dishes and annealed for approx. 4 h in air at 1270° C.

Yield: 502 kg $Nb_2O_5$

| Chemical analysis: | |
|---|---|
| Al | <1 ppm |
| As | <1 ppm |
| Ca | <1 ppm |
| Co | <0.1 ppm |
| Cr | <0.3 ppm |
| Cu | 0.3 ppm |
| F | 2 ppm |
| Fe | 4 ppm |
| K | 3 ppm |
| Mo | <0.3 ppm |
| Na | 2 ppm |
| Ni | 0.8 ppm |
| Si | 7 ppm |
| Ta | 20 ppm |
| Ti | <1 ppm |
| V | <1 ppm |
| Zr | <0.5 ppm |

| Physical analysis: | | |
|---|---|---|
| Loss on ignition (1200° C./2 h): | <0.05% | |
| Tap density: | 1.5 g/cm$^3$ | |
| Grain size distribution: | $D_{10}$ | 6.55 µm |
| | $D_{50}$ | 20.50 µm |
| | $D_{90}$ | 34.94 µm |
| Sieve analysis: | 97.5% | <45 µm |
| Specific surface area: | 0.45 cm$^2$/g | | c) Stabilization of the Oxide 21 kg of the niobium oxide produced under 3b) were annealed at 1400° C. under hydrogen for 4 h. The black product was comminuted and sieved to less than 300 µm.

Properties of the partially reduced oxide obtained in this way:

| | | |
|---|---|---|
| Oxygen: | 27.0% | |
| Carbon: | <10 ppm | |
| Σ (Fe, Cr, Ni): | <10 ppm | |
| Specific surface area: | 0.12 m$^2$/g | |
| Grain size distribution: | $D_{10}$ | 16.4 µm |
| | $D_{50}$ | 34.6 µm |
| | $D_{90}$ | 70.7 µm | d) Reduction of the Spherical, Stabilized Oxide to Form Nb Powder

In each case 500 g of the stabilized, partially reduced niobium oxide produced under 3c) were placed onto a fabric sieve positioned in an Nb dish. In each case 267 g of magnesium chips were placed below. The dishes were closed and reduction was carried out in a retort for 6 h at 975° C. under argon. After cooling, air was slowly introduced into the retort in order to allow the metal surfaces to be passivated. The material was forced through a 300 µm sieve in order to be comminuted.

The reaction material obtained in this was leached in 8% strength sulfuric acid and washed neutral using deionized water. The moist powder was then dried for 24 h at 50° C. 579 g of Nb powder were obtained.

Properties of the niobium powder obtained in this way:

| | | |
|---|---|---|
| Specific surface area: | 4.7 m²/g | |
| Bulk density: | 14.2 g/inch³ | |
| Oxygen: | 16100 ppm | |
| Mean grain diameter (FSSS): | 3.0 µm | |
| Press strength: | 1.4 kg | |
| Flow property: | 42 s/25 g | |
| Grain size distribution: | $D_{10}$ | 17 µm |
| | $D_{50}$ | 32 µm |
| | $D_{90}$ | 56 µm |
| Sieve analysis: | >300 µm | 0.0% |
| | >212 µm | 0.2% |
| | >150 µm | 0.2% |
| | >106 µm | 0.4% |
| | >63 µm | 1.1% |
| | >38 µm | 14.0% |
| | <38 µm | 84.1% |

| Chemical analysis: | |
|---|---|
| C | 27 ppm |
| H | 436 ppm |
| Mg | 330 ppm |
| N | 300 ppm |
| O | 16100 ppm |
| P | <5 ppm |
| Na | 2 ppm |
| K | 2 ppm |
| Fe | 8 ppm |
| Cr | <2 ppm |
| Ni | <2 ppm |
| F | <2 ppm |

Electrical Test:

Capacitor anodes were produced from the powder produced in this way and their specific capacitance and residual current were measured. For this purpose, the powder was pressed with a pressed density of 3.14 g/cm³ and was sintered under a high vacuum at 1170° C. for 20 minutes. The pellet obtained in this way was anodically oxidized (formed) in 0.1% strength $H_3PO_4$ with a conductivity of 3100 µS/cm at 40 V and a forming current of 200 mA/g for 2 h at a temperature of 80° C. The residual current of the anode was measured in 18% strength $H_2SO_4$ at a temperature of 23° C., a charge time of 2 minutes and a voltage of 28 V (70% of the forming voltage), and the capacitance was measured in 18% strength $H_2SO_4$ at a temperature of 23° C. and a frequency of 120 Hz.

| | |
|---|---|
| Sintered density: | 3.14 g/cm³ |
| Specific capacitance: | 156449 µFV/g |
| Residual current: | 0.18 nA/µFV |

Example 4

Reduction of Fibrous $Ta_2O_5$ to Form Fibrous Ta Powder of Analogous Morphology a) Oxide Precursor A commercially available fibrous oxide precursor produced by Zircar was used.

b) Stabilization of the Oxide 500 g of the oxide were annealed at 1650° C. under nitrogen for 3 h. The oxide was then reannealed at 1000° C. in air in order to remove carbon impurities. The white oxide, which had been stabilized in this way, was comminuted and sieved to less than 1000 µm.

Figure 3:
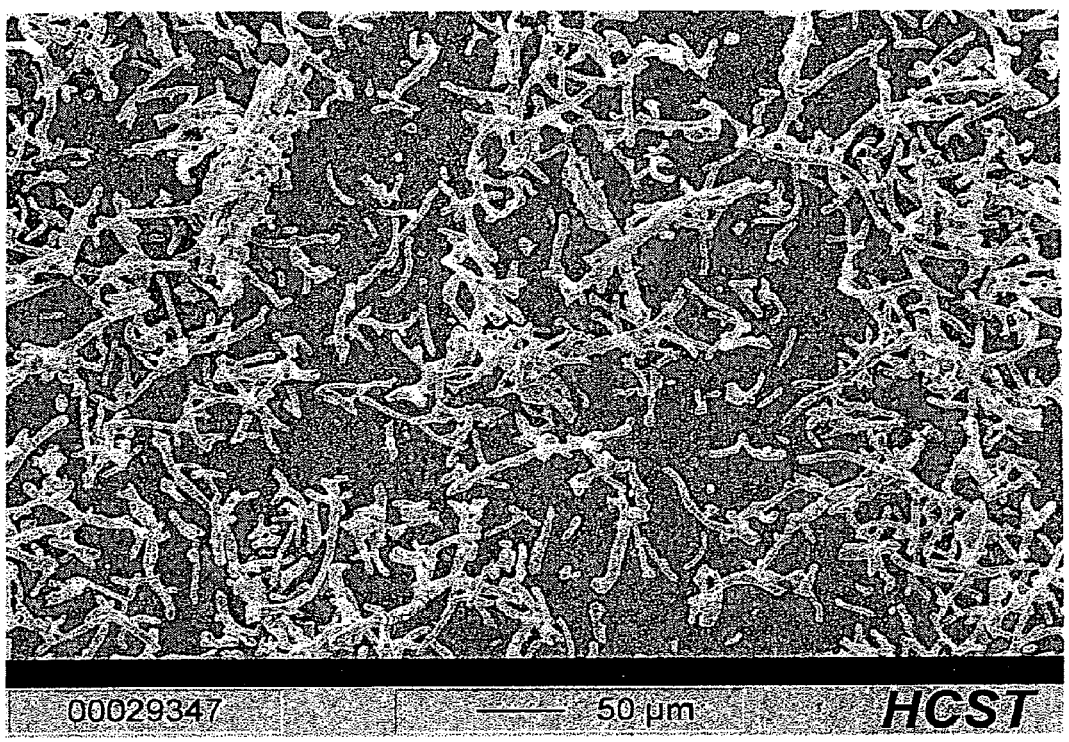
FIG. 3 shows a SEM image of the stabilized oxide.

FIG. 3 shows a SEM image of the stabilized oxide. A fibrous morphology is clearly apparent.

c) Reduction of the Fibrous, Stabilized Oxide to Form Ta Powder 200 g of the stabilized tantalum oxide produced under 4b) were placed onto a fabric sieve positioned in a Ta dish. 60 g of magnesium chips were placed below. The dish was closed and reduction was carried out in a retort for 8 h at 950° C. under argon. After cooling, air was slowly introduced into the retort in order to allow passivation of the metal surfaces. The material was forced through a 1000 µm sieve for comminution.

The reaction material obtained in this way was leached in 12% strength sulfuric acid and washed neutral with deionized water. The moist powder was then dried for 24 h at 50° C. 140 g of Ta powder were obtained.

Properties of the primary powder obtained in this way:

| | |
|---|---|
| Specific surface area: | 2.2 m²/g |
| Bulk density: | 20.0 g/inch³ |
| Oxygen: | 7520 ppm |

Figure 4:
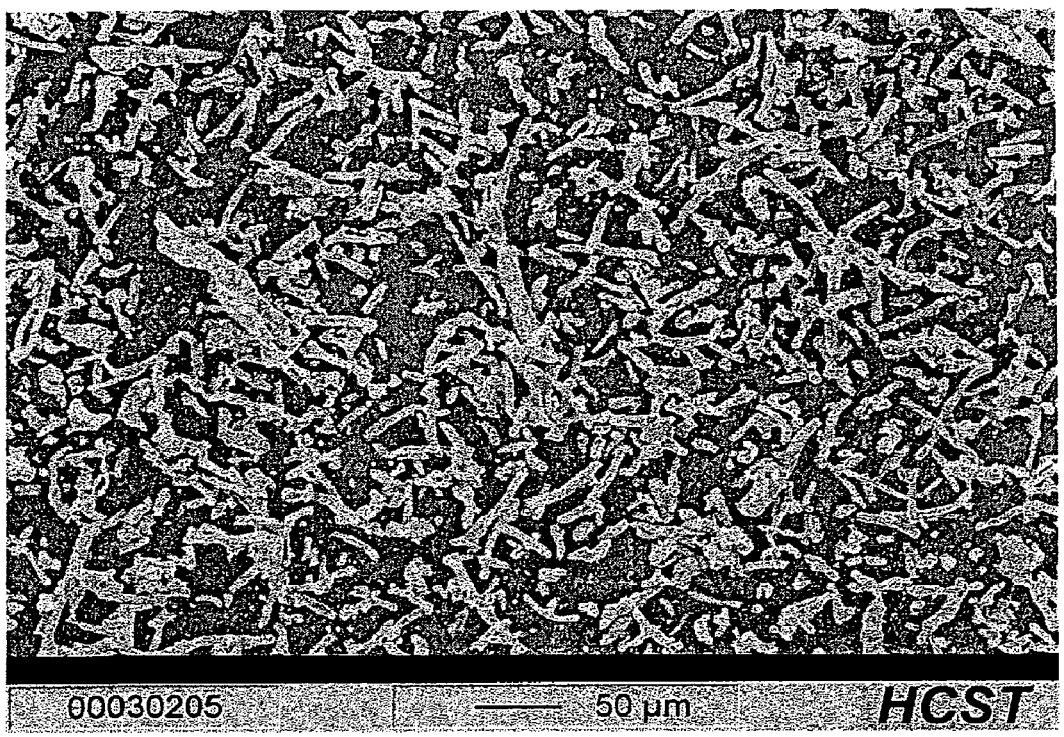
FIG. 4 shows an SEM image of the tantalum powder obtained.

FIG. 4 shows an SEM image of the tantalum powder obtained. A comparison with FIG. 3 shows that the fibrous morphology was retained during the reduction of the stabilized oxide.

Example 5

Reduction of Platelet-Like $Ta_2O_5$ to Form a Platelet-Like Ta Powder of Analogous Morphology a) Production of the Platelet-Like Hydroxide Precursor 250 ml of a mixture of identical proportions by volume of tantalum ethoxide ($Ta(OC_2H_5)_5$) and Ethanol ($C_2H_5OH$) were applied dropwise and uniformly to a smooth surface made from polypropylene and were dried at room temperature with air being supplied.

b) Production of Oxide

The platelet-like tantalum hydroxide produced under a) was placed into dishes and annealed for approx. 3 h at 700° C. in air.

Yield: approx. 100 g $Ta_2O_5$

Specific surface area: 4.67 g/cm² c) Stabilization of the oxide 500 g of the oxide were annealed at 1650° C. under nitrogen for 3 h. Then, the oxide was annealed further at 1000° C. in air in order to remove carbon impurities. The white oxide stabilized in this way is comminuted and sieved to less than 1000 µm.

Figure 5:
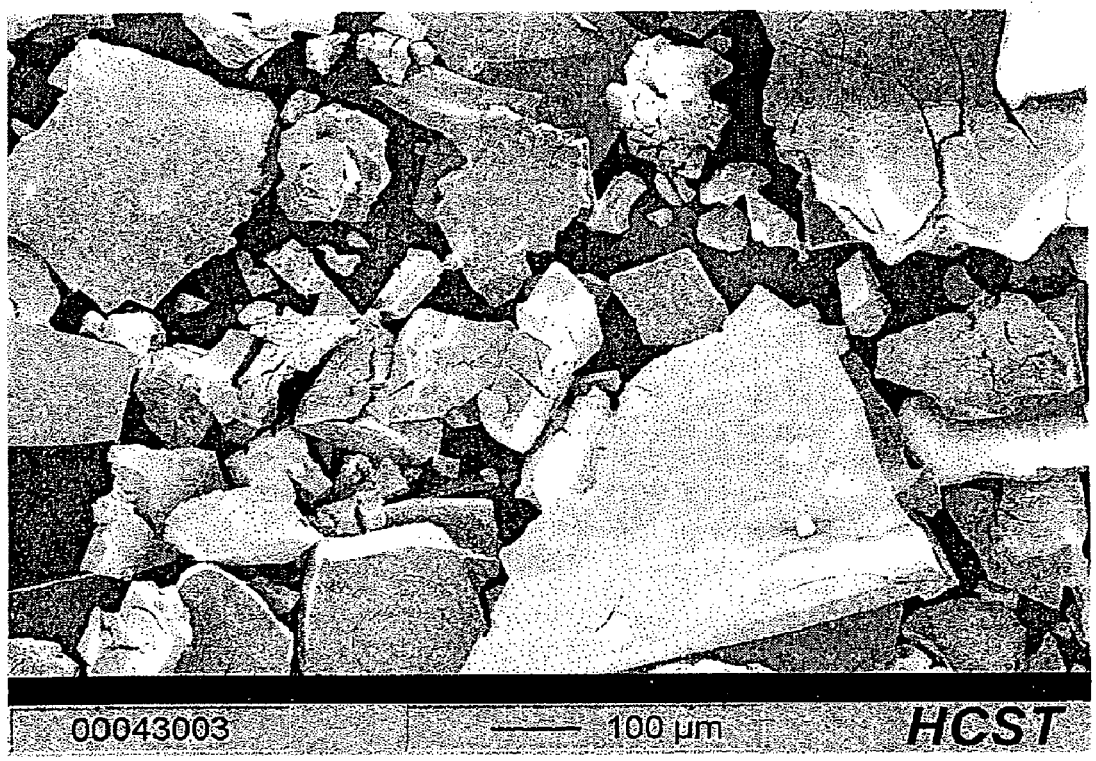
FIG. 5 shows an SEM image of the stabilized oxide.

FIG. 5 shows an SEM image of the stabilized oxide. The platelet-like morphology is clearly apparent.

d) Reduction of the Platelet-Like, Stabilized Oxide to Form Ta Powder 200 g of the stabilized tantalum oxide produced under 5c) were placed onto a fabric sieve positioned in a Ta dish. 60 g of magnesium chips were placed below. The dish was closed and reduction was carried out in a retort for 6 h at 980° C. under argon. After cooling, air was slowly introduced into the retort, in order to allow passivation of the metal surfaces. The material was forced through a 1000 μm sieve in order to be comminuted.

The reaction material obtained in this way was leached in 12% strength sulfuric acid and washed neutral using deionized water. The moist powder was then dried for 24 h at 50° C. 140 g of Ta powder were obtained.

Properties of the primary powder obtained in this way:

| | |
|---|---|
| Specific surface area: | 2.0 m²/g |
| Bulk density: | 32.0 g/inch³ |
| Oxygen: | 6370 ppm |

Figure 6:
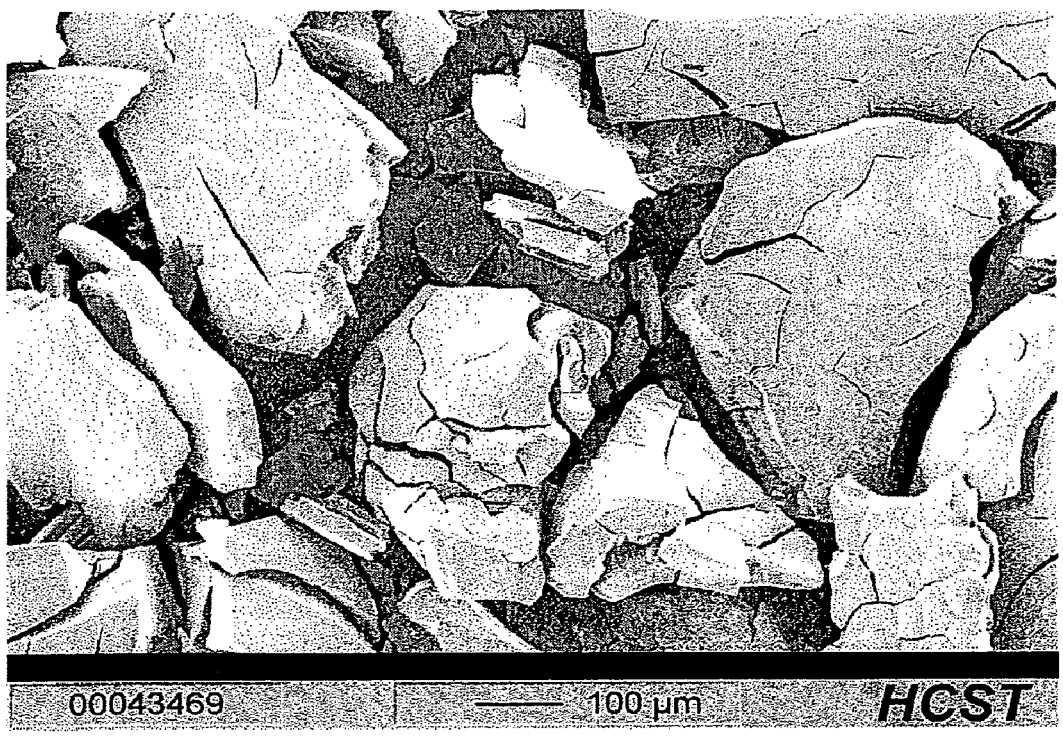
FIG. 6 shows another SEM image of tantalum powder.

FIG. 6 shows an SEM image of the tantalum powder prior to the treatment with 12% strength sulfuric acid. A comparison with FIG. 5 shows that the platelet-like morphology was retained during the reduction of the stabilized oxide.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A valve metal powder comprising niobium or tantalum prepared by a method comprising the sequential steps of:
    (a) producing a precursor of preformed morphology;
    (b) converting the precursor into an oxide of the valve metal;
    (c) stabilizing the morphology of the oxide by heat treatment; and
    (d) reducing the stabilized oxide while retaining the morphology, thereby forming said valve metal powder,
wherein, said precursor has a morphology comprising a primary structure, a secondary structure and a tertiary structure, and said valve metal powder has a morphology comprising a primary structure, a secondary structure and a tertiary structure,
further wherein, said stabilization step is performed such that the secondary structure of said valve metal powder corresponds to the secondary structure of said precursor, and the tertiary structure of said valve metal powder corresponds to the tertiary structure of said precursor and said valve metal powder has a specific surface area of 0.4 to 10 m²/g.

2. The valve metal powder of claim 1 wherein said valve metal powder has a $D_{90}$ value, determined by means of a MasterSizer in accordance with ASTM B 822, of less than or equal to 1.5 times the $D_{50}$ value of the valve metal powder, as determined by means of a MasterSizer in accordance with ASTM B 822.

3. The valve metal powder of claim 1 wherein said valve metal powder has a $D_{10}$ value, determined by means of a MasterSizer in accordance with ASTM B 822, of greater than 5 μm.

4. The valve metal powder of claim 1 wherein the valve metal alloys consists of alloys of tantalum or niobium.

5. A process for producing an anode for electrolytic capacitors which comprises pressing and sintering the valve metal powder of claim 1 to form an anode body.

6. A process for producing an anode for electrolytic capacitors which have capacitances of greater than 50,000 CV/g which comprises pressing and sintering the valve metal powder of claim 1 to form an anode body.

7. A valve metal powder prepared by a method comprising the sequential steps of:
    (a) producing a precursor of preformed morphology;
    (b) converting the precursor into an oxide of the valve metal;
    (c) stabilizing the morphology of the oxide by heat treatment; and
    (d) reducing the stabilized oxide while retaining the morphology, thereby forming said valve metal powder,
wherein, said precursor has a morphology comprising a primary structure, a secondary structure and a tertiary structure, and said valve metal powder has a morphology comprising a primary structure, a secondary structure and a tertiary structure,
    further wherein, said stabilization step is performed such that the secondary structure of said valve metal powder corresponds to the secondary structure of said precursor, and the tertiary structure of said valve metal powder corresponds to the tertiary structure of said precursor, and
    comprising spherical agglomerates, wherein said valve metal powder has a $D_{50}$ value, determined by means of a MasterSizer in accordance with ASTM B 822, of 10 to 80 μm, and the valve metal powder flows freely through a Hall-Flow funnel with a funnel opening diameter of ²⁄₁₀ inch.

8. Anode bodies produced from the valve metal powder prepared by a method comprising the sequential steps of:
    (a) producing a precursor of preformed morphology;
    (b) converting the precursor into an oxide of the valve metal;
    (c) stabilizing the morphology of the oxide by heat treatment; and
    (d) reducing the stabilized oxide while retaining the morphology, thereby forming said valve metal powder,
wherein, said precursor has a morphology comprising a primary structure, a secondary structure and a tertiary structure, and said valve metal powder has a morphology comprising a primary structure, a secondary structure and a tertiary structure,
    further wherein, said stabilization step is performed such that the secondary structure of said valve metal powder corresponds to the secondary structure of said precursor, and the tertiary structure of said valve metal powder corresponds to the tertiary structure of said precursor,
    and have a bimodal pore distribution comprising a smaller maximum and a larger maximum, the smaller maximum of the bimodal pore distribution corresponding to the primary structure of the valve metal powder, and the larger maximum of the bimodal pore distribution corresponding to the secondary structure of the valve metal powder.

9. The anode bodies of claim 8 wherein the larger maximum of the bimodal pore distribution, determined by means of mercury porosimetry, is between 0.5-5 μm.

10. A valve metal powder comprising niobium or tantalum prepared by a process comprising the sequential steps of:
    a) providing a precursor having preformed morphology, said precursor being an oxide of a valve metal;
    b) stabilizing the morphology of the oxide by heat treatment; and
    c) reducing the stabilized oxide while retaining the morphology, thereby forming said valve metal powder,
wherein, said precursor has a morphology comprising a primary structure, a secondary structure and a tertiary structure, and said valve metal powder has a morphology comprising a primary structure, a secondary structure and a tertiary structure, further wherein, said stabilization step is performed such that the secondary structure of said valve metal powder corresponds to the secondary structure of said precursor, and the tertiary structure of said valve metal powder corresponds to the tertiary structure of said precursor, and said valve metal powder has a specific surface area (BET) of 0.4 up to 10 m²/g.

11. A valve metal powder comprising spherical agglomerates, wherein said valve metal powder has a $D_{50}$ value, determined by means of a MasterSizer in accordance with ASTM B 822, of 10 to 80 μm, and the valve metal powder flows freely through a Hall-Flow funnel with a funnel opening diameter of 2/10 inch, and said valve metal powder has a specific surface area (BET) of 0.4 up to 10 m²/g.

12. The valve metal powder of claim 11, wherein said valve metal powder has a $D_{90}$ value, determined by means of a MasterSizer in accordance with ASTM B 822, of less than or equal to 1.5 times the $D_{50}$ value of the valve metal powder, as determined by means of a MasterSizer in accordance with ASTM B 822, and said valve metal powder has a specific surface area (BET) of 0.4 up to 10 m²/g.

13. The valve metal powder of claim 11, wherein said valve metal powder has a $D_{10}$ value, determined by means of a MasterSizer in accordance with ASTM B 822, of greater than 5 μm, and said valve metal powder has a specific surface area (BET) of 0.4 up to 10 m²/g.

14. The valve metal powder of claim 11, wherein the valve metal of the valve metal powder is selected from the group consisting of tantalum, niobium and alloys thereof.

* * * * *